US012796673B2

(12) United States Patent
Grossi et al.

(10) Patent No.: US 12,796,673 B2
(45) Date of Patent: Nov. 17, 2026

(54) SYSTEMS AND METHODS FOR AN AGRICULTURAL APPLICATOR

(71) Applicants: CNH Industrial America LLC, New Holland, PA (US); CNH Industrial Italia S.p.A., Turin (IT)

(72) Inventors: Federica Grossi, Modena (IT); Francesco Pintore, Modena (IT); Daniel Payne, Westmont, IL (US); Ciro Mariniello, Formigine (IT); Michelantonio Forte, Modena (IT)

(73) Assignees: CNH Industrial America LLC, New Holland, PA (US); CNH Industrial Italia S.p.A., Turin (IT)

( * ) Notice: Subject to any disclaimer, the term of this patent is extended or adjusted under 35 U.S.C. 154(b) by 239 days.

(21) Appl. No.: 18/505,614

(22) Filed: Nov. 9, 2023

(65) Prior Publication Data

US 2025/0151710 A1 May 15, 2025

(51) Int. Cl.
*A01M 7/00* (2006.01)

(52) U.S. Cl.
CPC .................................. *A01M 7/0042* (2013.01)

(58) Field of Classification Search
CPC .................................................. A01M 7/0042
See application file for complete search history.

(56) References Cited

U.S. PATENT DOCUMENTS

2014/0093397 A1* 4/2014 Engelbrecht ........ A01M 7/0089
417/46

FOREIGN PATENT DOCUMENTS

CN 107258196 A * 10/2017 .......... A01M 7/0042
CN 111264110 A * 6/2020 .......... A01M 7/0089
CN 115428780 A * 12/2022 .......... A01M 7/0064

OTHER PUBLICATIONS

English Translation CN107258196.*
English Translation CN111264110.*
English Translation CN115428780.*

* cited by examiner

*Primary Examiner* — Qingzhang Zhou
(74) *Attorney, Agent, or Firm* — Dority & Manning, P.A.

(57) ABSTRACT

An agricultural system is provided herein that includes a power plant and a transmission system operably coupled with the power plant. A product application system can be operably coupled with the transmission system through an application gear assembly. The product application system can include an electric machine operably coupled with the application gear assembly, a pump system operably coupled with the electric machine, and one or more nozzle assemblies configured to exhaust an agricultural product, the agricultural product driven by the pump system.

18 Claims, 6 Drawing Sheets

SYSTEMS AND METHODS FOR AN AGRICULTURAL APPLICATOR

FIELD OF THE INVENTION

The present subject matter relates generally to agricultural applicators that may be operated within an agricultural field.

BACKGROUND OF THE INVENTION

Various types of sprayers utilize applicators (e.g., sprayers, floaters, etc.) to deliver an agricultural product to the ground surface of a field. The agricultural product may be in the form of a solution or mixture, with a carrier (such as water) being mixed with one or more active ingredients (such as an herbicide, agricultural product, fungicide, a pesticide, or another product).

The applicators may be pulled as an implement or self-propelled and can include a tank, a pump, a boom assembly, and a plurality of nozzles carried by the boom assembly at spaced locations. The boom assembly can include a pair of boom arms, with each boom arm extending to either side of the applicator when in an unfolded state. Each boom arm may include multiple boom sections, each with a number of spray nozzles (also sometimes referred to as spray tips).

The spray nozzles on the boom assembly disperse the agricultural product carried by the applicator onto a field. During a spray operation, however, an engine (or other power plant) may operate at a fixed speed. In such instances, the control of the flow rate may be performed by a flow-controlled hydraulic valve, which can lead to hydraulic losses when the engine is run at high idle and small or no spraying flow is being performed. Accordingly, an improved system and method for monitoring the quality of application of the agricultural product to the field would be welcomed in the technology.

BRIEF DESCRIPTION OF THE INVENTION

Aspects and advantages of the technology will be set forth in part in the following description, or may be obvious from the description, or may be learned through practice of the technology.

In some aspects, the present subject matter is directed to an agricultural system that includes a power plant and a transmission system operably coupled with the power plant. A product application system is operably coupled with the transmission system through an application gear assembly. The product application system further includes an electric machine operably coupled with the application gear assembly, a pump system operably coupled with the electric machine, and one or more nozzle assemblies configured to exhaust an agricultural product, the agricultural product driven by the pump system.

In some aspects, the present subject matter is directed to a method for operating an agricultural system. The method includes driving a gear train with a power plant. The method also includes rotating an electric machine with an application gear assembly operably coupled with the gear train. Lastly, the method includes driving a pump system to exhaust an agricultural product from one or more nozzle assemblies with the electric machine.

In some aspects, the present subject matter is directed to a method for operating an agricultural system. The method includes driving a gear train with a power plant. The method also includes rotating an electric machine with an application gear assembly operably coupled with the gear train. The method further includes transferring electrical energy generated by the electric machine to one or more energy storage devices. Lastly, the method includes providing electrical power from one or more energy devices to the pump system to cause the pump system to exhaust an agricultural product from one or more nozzle assemblies.

These and other features, aspects, and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
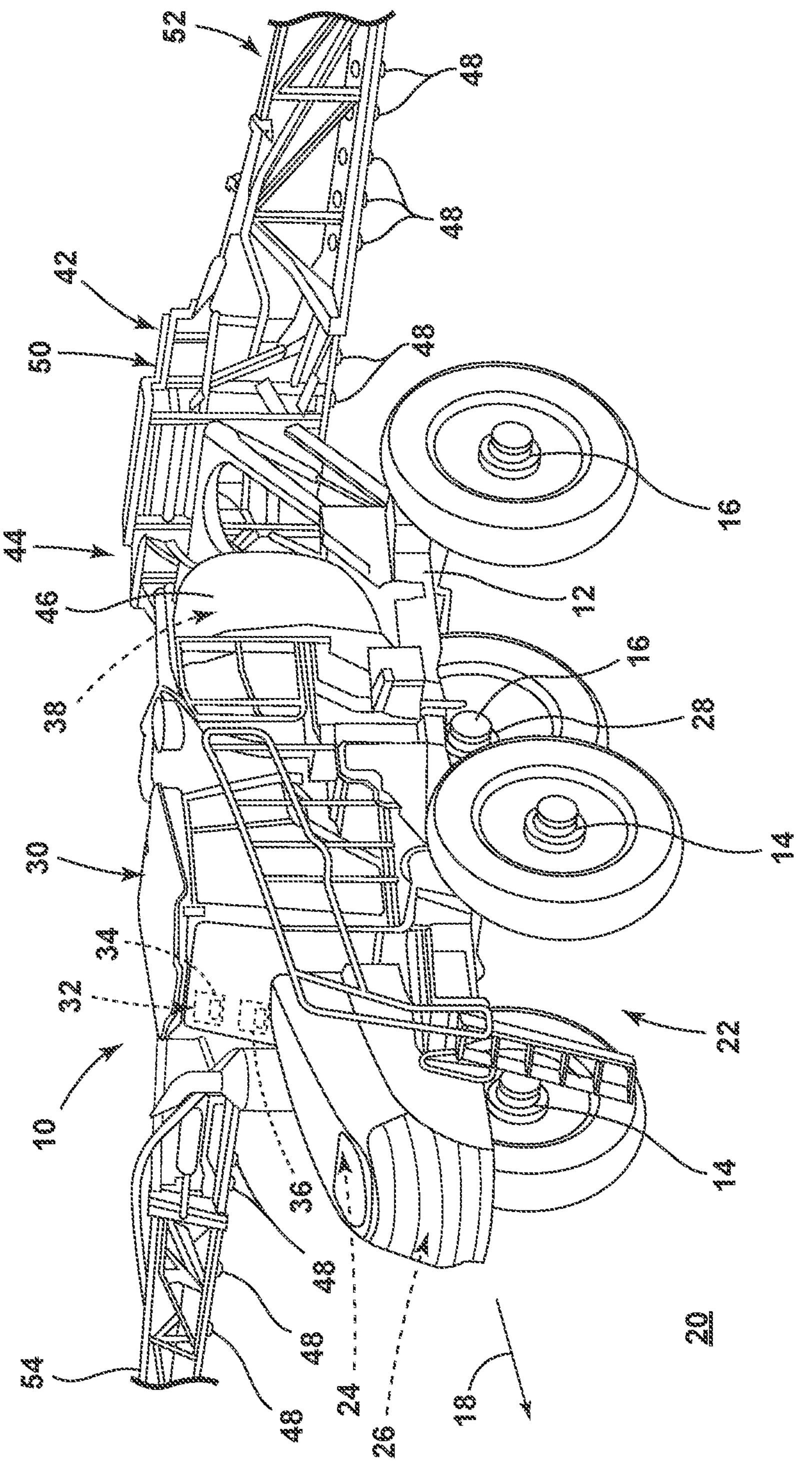
FIG. 1 illustrates a perspective view of an agricultural sprayer in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the disclosure, one or more examples of which are illustrated in the drawings. Each example is provided by way of explanation of the discourse, not limitation of the disclosure. In fact, it will be apparent to those skilled in the art that various modifications and variations can be made in the present disclosure without departing from the scope or spirit of the disclosure. For instance, features illustrated or described as part can be used with another embodiment to yield a still further embodiment. Thus, it is intended that the present disclosure covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms “comprises,” “comprising,” or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to an agricultural product within a fluid circuit. For example, "upstream" refers to the direction from which an agricultural product flows, and "downstream" refers to the direction to which the agricultural product moves. The term "selectively" refers to a component's ability to operate in various states (e.g., an ON state and an OFF state) based on manual and/or automatic control of the component.

Furthermore, any arrangement of components to achieve the same functionality is effectively "associated" such that the functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

In general, the agricultural system provided herein can include a power plant and a transmission system operably coupled with the power plant. A product application can be system operably coupled with the transmission system through an application gear assembly.

The product application system can include an electric machine operably coupled with the application gear assembly. The product application system can further include a pump system operably coupled with the electric machine. One or more nozzle assemblies can be configured to exhaust an agricultural product therefrom with the agricultural product driven by the pump system.

In some instances, the power provided to the pump system can be provided from the electric machine and/or the energy storage device. In addition, the power provided to the pump system can be a function of a power plant operating point, a torque requirement of any or all other components of the vehicle, and/or the state of charge of the energy storage device. Based on the product application system being capable of running at least partially independently of the power plant (e.g., power to the pump system can be provided by the energy storage device for an amount of time and/or power provided by the energy storage device can supplement the power plant 24), the system may achieve a controllable flow rate that is less or not dependent on the engine speed. For instance, since the flow rate of the application system may not be dependent on engine speed, the flow rate can be set by controlling the speed of the electric machine to allow for a constant flow rate while variations in the operational state of the power plant occur. Additionally, in some examples, the vehicle may achieve a full electric spray operation in which the product application system is powered by the energy storage device rather than the power plant. Additionally or alternatively, the energy storage device may be operably coupled with an additional implement that is configured to perform additional agricultural operations.

Figure 2:
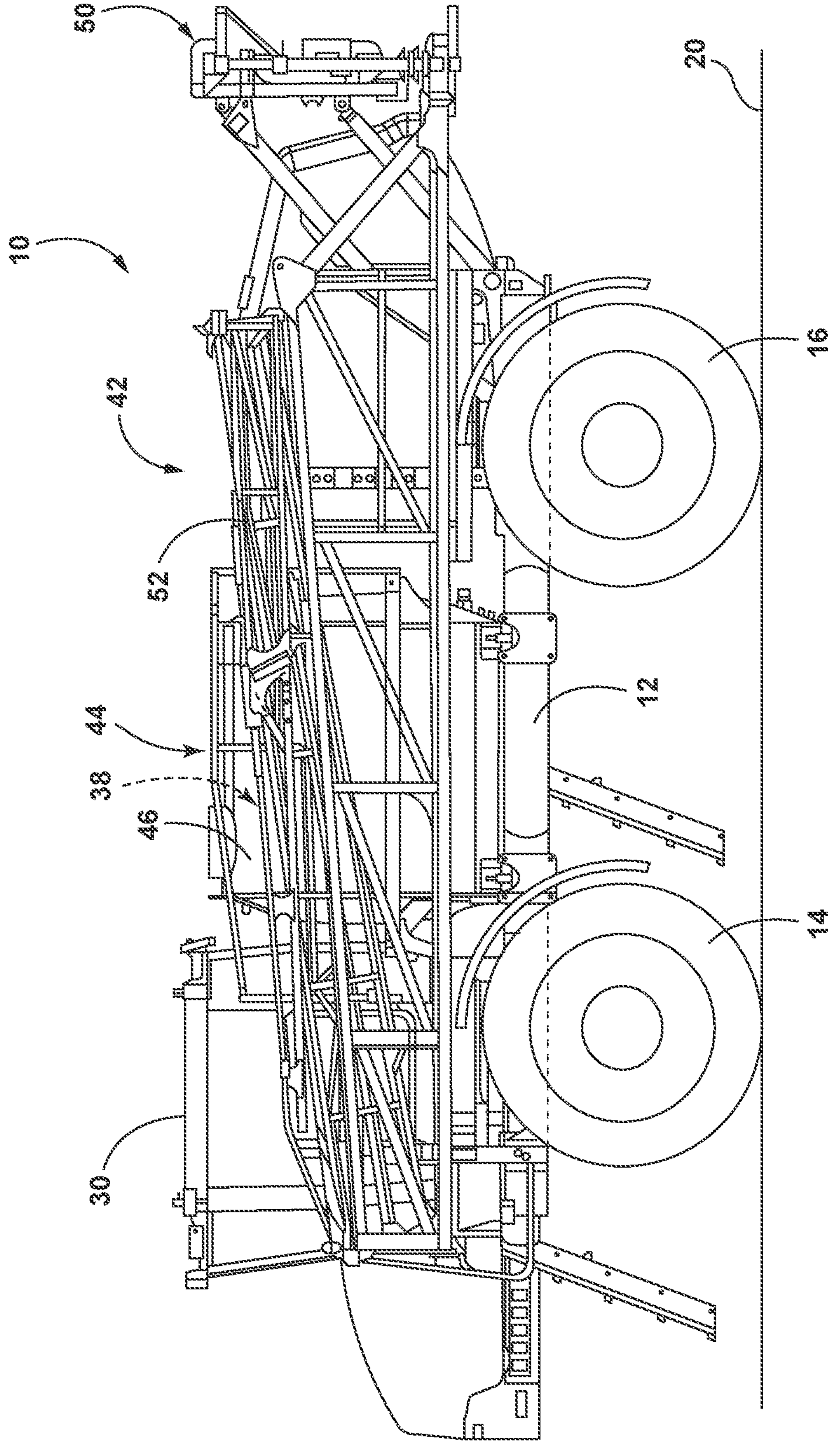
FIG. 2 illustrates a side view of the sprayer in accordance with aspects of the present subject matter.

Referring now to FIGS. 1 and 2, a sprayer 10 is generally illustrated as a self-propelled agricultural applicator. However, in alternate embodiments, the sprayer 10 may be configured as any other suitable type of sprayer 10 configured to perform agricultural application operations, such as a tractor or other vehicle configured to haul or tow an application implement.

In various embodiments, the sprayer 10 may include a chassis 12 configured to support or couple to a plurality of components. For example, front and rear wheels 14, 16 may be coupled to the chassis 12. The wheels 14, 16 may be configured to support the sprayer 10 relative to a field 20 and move the sprayer 10 in a direction of travel (e.g., as indicated by arrow 18 in FIG. 1) across the field 20. In this regard, the sprayer 10 may include a powertrain control system 22 that includes a power plant 24, such as an engine, a motor, or a hybrid engine-motor combination, a hydraulic propel or transmission system 26 configured to transmit power from the power plant 24 to the wheels 14, 16, and/or a brake system 28.

The chassis 12 may also support a cab 30, or any other form of user's station, permitting the user to control the operation of the sprayer 10. For instance, as shown in FIG. 1, the sprayer 10 may include a user interface 32 having a display 34 for providing messages and/or alerts to the user and/or for allowing the user to interface with the vehicle's controller through one or more user input devices 36 (e.g., levers, pedals, control panels, buttons, and/or the like).

The chassis 12 may also support a boom assembly 42 mounted to the chassis 12. In addition, the chassis 12 may support a product application system 44 that includes one or more tanks 46, such as a rinse tank and/or a product tank. The product tank is generally configured to store or hold an agricultural product 38, such as a pesticide, a fungicide, a rodenticide, a nutrient, and/or the like. The agricultural product 38 is conveyed from the product tank through plumbing components, such as interconnected pieces of tubing, for release onto the underlying field 20 (e.g., plants and/or soil) through one or more nozzle assemblies 48 mounted on the boom assembly 42.

As shown in FIGS. 1 and 2, the boom assembly 42 can include a frame 50 that supports first and second boom arms 52, 54, which may be orientated in a cantilevered nature. The first and second boom arms 52, 54 are generally movable between an operative or unfolded position (FIG. 1) and an inoperative or folded position (FIG. 2). When distributing the product, the first and/or second boom arm 52, 54 extends laterally outward from the sprayer 10 to cover swaths of the underlying field 20, as illustrated in FIG. 1. However, to facilitate transport, each boom arm 52, 54 of the boom assembly 42 may be independently folded forwardly or rearwardly into the inoperative position, thereby reducing the overall width of the vehicle 10, or in some examples, the overall width of a towable implement when the applicator is configured to be towed behind the sprayer 10.

It will be appreciated that the configuration of the agricultural sprayer 10 described above and shown in FIGS. 1 and 2 are provided only to place the present subject matter in an example field of use. Thus, it will be appreciated that the present subject matter may be readily adaptable to any manner of machine configuration, including any suitable sprayer configuration and/or implement configuration.

Figure 3:
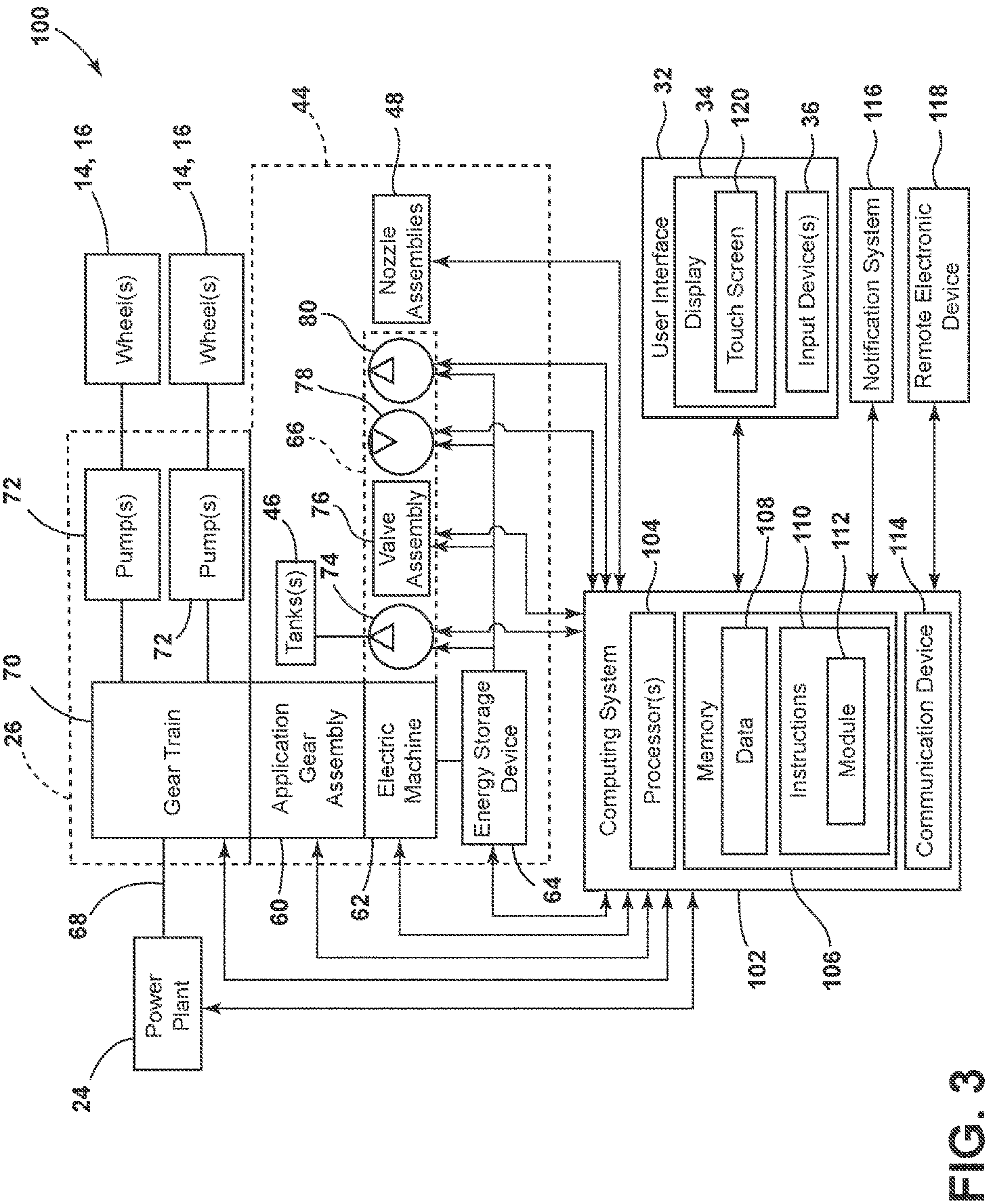
FIG. 3 illustrates a block diagram of components of a system for an agricultural sprayer in accordance with aspects of the present subject matter.
Figure 4:
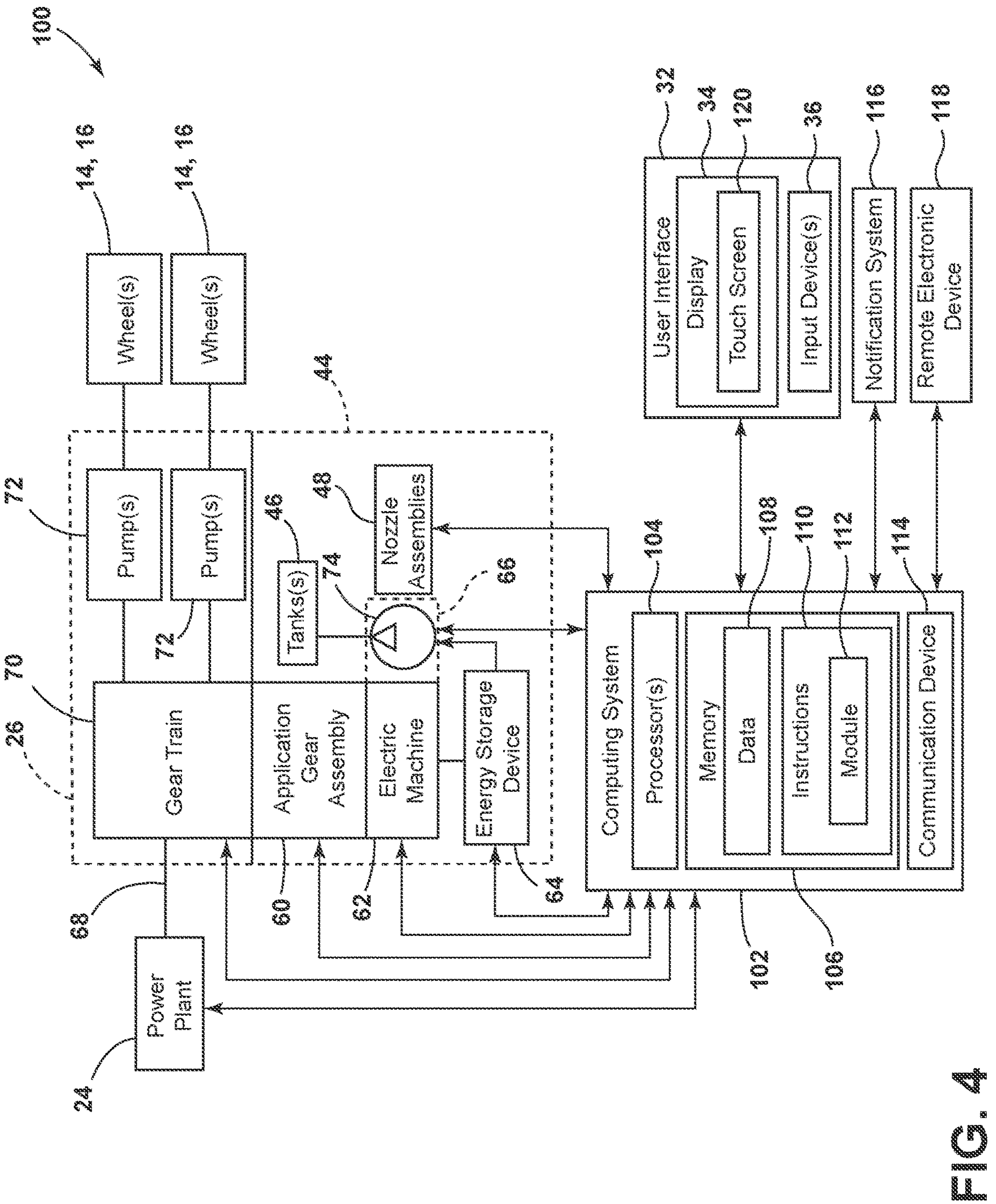
FIG. 4 illustrates a block diagram of components of a system for an agricultural sprayer in accordance with aspects of the present subject matter.

Referring now to FIGS. 3 and 4, schematic views of a system 100 that can include the power plant 24, the transmission system 26, and the product application system 44 are illustrated in accordance with aspects of the present subject matter. However, it should be appreciated by those of ordinary skill in the art that the disclosed system 100 may generally be utilized with agricultural machines having any other suitable machine configuration.

As shown in FIGS. 3 and 4, the system 100 may include a computing system 102 operably coupled with the product application system 44 to dispense an agricultural product 38 from the product application system 44 to the field 20 (FIG. 1) through one or more nozzle assemblies 48 that may be positioned at least partially along the boom assembly 42 (FIG. 1). The product application system 44 may further be operably coupled with the transmission system 26 (or otherwise operably coupled) with the power plant 24. In general, the power plant 24, through the transmission system 26 and/or through other means, may generate power that may be transferred to an application gear assembly 60. The application gear assembly 60 may be operably coupled with an electric machine 62, which may be configured as an electric motor/generator. The electric machine 62 may be further coupled to an electric energy storage device 64 and/or a pump system 66. The pump system 66 is operably coupled with the one or more nozzle assemblies 48. Through the usage of the product application system 44 provided herein, a flow rate of the agricultural product is not dependent on engine speed. As such, the product application system 44 may be set by controlling the speed of the electric machine 62 driving the pump system 66, the pump parameters of the pump system 66, and/or by defining the operational parameters of any component downstream of the application gear assembly 60 and/or within the application system 44.

As shown in FIGS. 3 and 4, the power plant 24 may be operably coupled with the transmission system 26 through one or more shafts 68. As provided herein, the power plant 24 may be configured as an engine, a motor, a hybrid engine-motor combination, and/or any other power generating or transferring system.

In some cases, the transmission system 26 can include a gear train 70 to transfer power from the power plant 24 to one or more components. In some cases, the gear train 70 may be configured as an epicyclical gear train that includes at least two gear types, in which a sun gear is in the center of the gear train and a planet gear is in epicyclical relationship to the sun gear. In other words, the center of at least one planet gear revolves around the center of the sun gear as the sun gear rotates on its fixed axis. The planet gears are supported by a carrier, which may aid in transferring torque from the sun gear to the planet gear. The planet gears are surrounded by a fixed annular gear, of which the teeth of the planet gear ride on the annular gear and sun gear. In other embodiments, a second planet gear set is placed radially between a first planet gear set and the annular gear. In another embodiment, the epicyclical gear train is of a star gear configuration, in which the center of each planet gear is fixed such that the planet gear rotates on a fixed axis relative to the sun gear. The surrounding annular gear rotates and transfers torque from the input power transferred to the sun gear. The carrier acts as a spacer between the sun gear and the planet gears and fixes the axis of each planet gear.

One or more pumps 72 can be operably coupled with the gear train 70 within the transmission system 26. In various examples, the pumps 72 may be fixed as hydrostatic pumps. Additionally or alternatively, each of the pumps 72 may be configured as variable displacement pumps or fixed displacement pumps. In operation, the pumps 72 may be driven by the gear train 70 which in turn generates a fluid pressure for driving the vehicle. For instance, the fluid pressure flow may provide a forward driving force of varying magnitude, a rearward driving force of varying magnitude, or a neutral driving force (associated with a zero ground speed). One or more output shafts of the hydrostatic transmission may be connected (directly or indirectly) to a drive shaft or axle rotatably connected to the wheel(s) 14, 16. As such, by changing the fluid pressure flow of the pumps 72, the driving force applied to the wheel(s) 14, 16 may be affected.

As illustrated in FIGS. 3 and 4, the product application system 44 may be operably coupled with the transmission system 26 (or otherwise operably coupled) with the power plant 24. In general, the power plant 24, through the transmission system 26 and/or through other means, may generate power that may be transferred to an application gear assembly 60. In some examples, the application gear assembly 60 may be operably coupled with the gear train 70 such that the output of the application gear assembly 60 is in a parallel arrangement with the output shafts of the transmission system 26. In some instances, the application gear assembly 60 can include a clutch, or other device, for selectively providing rotational movement to electric machine 62 based on various operational states and conditions.

The application gear assembly 60 may be further operably coupled with an electric machine 62, which may be configured as an electric motor/generator. In various examples, the electric generator may generally include a rotor and a stator. The rotational energy generated by the application gear assembly 60 can be configured to rotate the rotor of the electric generator relative to the stator. Such relative movement may generate electrical power.

The electric machine 62 may be further coupled to an electric energy storage device 64, which may be configured as one or more batteries, such as one or more lithium-ion batteries, or alternatively may be configured as any other suitable electrical energy storage device 64.

The pump system 66 is operably coupled with the electric machine 62, the energy storage device 64, and the one or more nozzle assemblies 48. As such, the pump system 66 may be powered by the electric machine 62 and/or the energy storage device 64. As illustrated in FIG. 3, the pump system 66 can include a plurality of pumps in series. For instance, as shown in FIG. 3, the pump system 66 can include a first pump 74, such as a fixed displacement pump, operably coupled with the electric machine 62 and fluidly coupled with the one or more tanks 46. A valve assembly 76 may be operably coupled with the first pump 74. The valve assembly 76 can be configured to control the flow rate of the application system 44. In various examples, the valve assembly 76 may be configured as any practicable device to perform the functions provided herein.

Referring further to FIG. 3, a motor 78 may be positioned downstream of the valve assembly 76. Moreover, a second pump 80, such as a centrifugal pump, may be positioned downstream of the motor 76. One or more nozzle assemblies 48 may be fluidly coupled with the second pump 80 to exhaust the agricultural product from the product application system 44.

With further reference to FIG. 4, the pump system 66 can include a single pump, which may be powered by the electrical machine and/or the energy storage device 64 and fluidly coupled with the one or more tanks 46. In such instances, hydraulic losses caused by valve assemblies may be reduced, which, in turn, can lead to fuel savings when operating the vehicle.

Referring back to FIGS. 3 and 4, the computing system 102 may be operably coupled with the power plant 24, the transmission system 26, the product application system 44, and/or any other component. In general, the computing system 102 may include any suitable processor-based device, such as a computing device or any suitable combination of computing devices. Thus, in several examples, the computing system 102 may include one or more processors 104 and associated memory 106 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 106 of the computing system 102 may generally comprise memory element(s) including, but not limited to, a computer-readable medium (e.g., random access memory (RAM)), a computer-readable non-volatile medium (e.g., a flash memory), a floppy disk, a compact disc-read only memory (CD-ROM), a magneto-optical disk (MOD), a digital versatile disc (DVD) and/or other suitable memory elements. Such memory 106 may generally be configured to store suitable computer-readable instructions that, when implemented by the processors 104, configure the computing system 102 to perform various computer-implemented functions, such as one or more aspects of the data processing algorithm(s) and/or related method(s) described below. In addition, the computing system 102 may also include various other suitable components, such as a communications circuit or module, one or more input/output channels, a data/control bus, and/or the like.

It will be appreciated that, in several examples, the computing system 102 may correspond to an existing controller of the sprayer 10, or the computing system 102 may correspond to one or more separate processing devices. For instance, in some examples, the computing system 102 may form all or part of a separate plug-in module or computing device(s) that is installed relative to the sprayer 10 or the product application system 44 to allow for the disclosed system 150 and method to be implemented without requiring additional software to be uploaded onto existing control devices of the sprayer 10 or the product application system 44.

In several embodiments, the data 108 may be stored in one or more databases. For example, the memory device 106 may include various databases for storing data associated with the operation of the vehicle 10, such as operation data, sensor data, field data, map data, application data, agricultural product data, correlation tables, and/or the like. Such data may include, for example, information received from one or more components, features, systems, and/or subsystems of the sprayer 10. For instance, the computing system 102 may be communicatively coupled to the power plant 24, the transmission system 26, the product application system 44, and/or any other component, the user interface 32, and/or any other system.

Referring still to FIGS. 3 and 4, in several embodiments, the instructions 110 stored within the memory device 106 of the computing system 102 may be executed by the processor(s) 104 to implement one or more modules 114, such as a data analysis module or an active control module. For example, a data analysis module may be executed or implemented by processor(s) 104 to analyze data received from one or more components, features, systems, and/or subsystems of the sprayer 10 (e.g., sensors, etc.).

An active control module may be executed or implemented by the processor(s) 104 to alter or operate one or more systems of the vehicle 10. For instance, the active control module may control the operation of the electric machine 62 and/or the pump system 66. In some examples, the control module may operate the electric machine 62 in a first state in which the electric machine 62 generates electrical power for the operation of the pump system 66 and/or storing it in the energy storage device 64. The control module may operate the application system 44 in a second state in which energy stored within the energy storage device 64 is transferred to the pump system 66 through the electric machine 62. As such, the application system 44, when in the second state, may be operated independently or partially independently of the transmission system 26. In some cases, the computing system 102 may be configured to determine whether to operate the electric machine 62 in the first state or the second state based on one or more operational conditions. The conditions can include a power plant operating point, a torque requirement of any or all other components of the vehicle, the state of charge of the energy storage device 64, etc.

Additionally, the active control module may be executed or implemented by the processor(s) 104 to provide notification instructions to the user interface 32, a related vehicle notification system 116 (e.g., including components configured to provide visual, auditory, or haptic feedback, such as lights, speakers, vibratory components, and/or the like), and/or a remote electronic device 118. Particularly, the active control module may provide notification instructions to the user interface 32 based on a set flow rate of the pump system 66, a power separation of the power plant 24 and the energy storage device 64, a state of charge of the energy storage device 64, etc. (e.g., in the form of a warning via the components configured to provide visual, auditory, or haptic feedback, such as lights, speakers, vibratory components, and/or the like).

In addition, various other components may be adjusted or controlled by the computing system 102 via execution or implementation of the active control module. For instance, the computing system 102 may be configured to adjust or control the operation of one or more components, sub-systems, or systems of the power plant 24, the transmission system 26, the product application system 44, and/or any other component, the user interface 32, and/or any other system.

In some examples, the user interface 32 may be mounted within a cockpit module, an instrument cluster, and/or any other location within the cab 24. Additionally or alternatively, the user interface 32 may be mounted on an exterior portion of the sprayer 10.

In various examples, the user interface 32 of the disclosed system 100 may include a display 34 having a touchscreen 134. The display 34 may be capable of displaying information related to the operation of the sprayer 10. In some embodiments, the display 34 may include an input device in the form of circuitry within the touchscreen to receive an input corresponding with a location over the display 34. Additionally, the user interface 32 may also include various other types or forms of input devices 36, such as one or more joysticks, buttons, knobs, levers, input pads, and/or the like.

In several embodiments, the computing system 102 may be configured to communicate via wired and/or wireless communication with one or more remote electronic devices 118 through a communications device 120 (e.g., a transceiver). The network may be one or more of various wired or wireless communication mechanisms, including any combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary wireless communication networks include a wireless transceiver (e.g., a BLUETOOTH module, a ZIGBEE transceiver, a Wi-Fi transceiver, an IrDA transceiver, an RFID transceiver, etc.), local area networks (LAN), and/or wide area networks (WAN), including the Internet, providing data communication services. The electronic device 118 may include a display for displaying information to a user. For instance, the electronic device 118 may display one or more graphical user interfaces and may be capable of receiving remote user inputs associated with adjusting operating variables or thresholds associated with the sprayer 10. In addition, the electronic device 118 may provide feedback information, such as visual, audible, and tactile alerts, and/or allow the operator to alter or adjust one or more components, features, systems, and/or sub-systems of the sprayer 10 through the usage of the remote electronic device 118. It will be appreciated that the electronic device 118 may be any one of a variety of computing devices and may include a processor and memory. For example, the electronic device 118 may be a cell phone, mobile communication device, key fob, wearable device (e.g., fitness band, watch, glasses, jewelry, wallet), apparel (e.g., a tee shirt, gloves, shoes, or other accessories), personal digital assistant, headphones and/or other devices that include capabilities for wireless communications and/or any wired communications protocols.

With reference to FIGS. 3 and 4, in operation, a speed of operation of the electric machine 62 (or output of the electric machine 62) may be at least partially based on a requested flow rate of the application system 44. Specifically, in some instances, the power provided to the pump system 66 can be provided from the electric machine 62 and/or the energy storage device 64. In addition, the power provided to the pump system 66 can be a function of a power plant operating point, a torque requirement of any or all other components of the vehicle, and/or the state of charge of the energy storage device 64. Based on the product application system 44 being capable of running at least partially independently of the power plant 24 (e.g., power to the pump system 66 can be provided by the energy storage device 64 for an amount of time and/or power provided by the energy storage device 64 can supplement the power plant 24), the system may achieve a controllable flow rate that is less or not dependent on the engine speed. For instance, since the flow rate of the application system 44 may not be dependent on engine speed, the flow rate can be set by controlling the speed of the electric machine 62 to allow for a constant flow rate while variations in the operational state of the power plant 24 occur. Additionally, in some examples, the vehicle may achieve a full electric spray operation in which the product application system 44 is powered by the energy storage device 64 rather than the power plant 24. Additionally or alternatively, the energy storage device 64 may be operably coupled with an additional implement that is configured to perform additional agricultural operations.

Moreover, hydraulic losses and/or hydraulic torque drops caused by the product application system 44 can be minimized based on the disclosed system structure. In addition, in some cases, the tanks 46 of the product application system 44 may be refilled with the engine deactivated and/or with the engine running at a minimal state. Additionally or alternatively, tractive performance may be increased, and/or additional torque can be available for traction of the vehicle 10.

Figure 5:
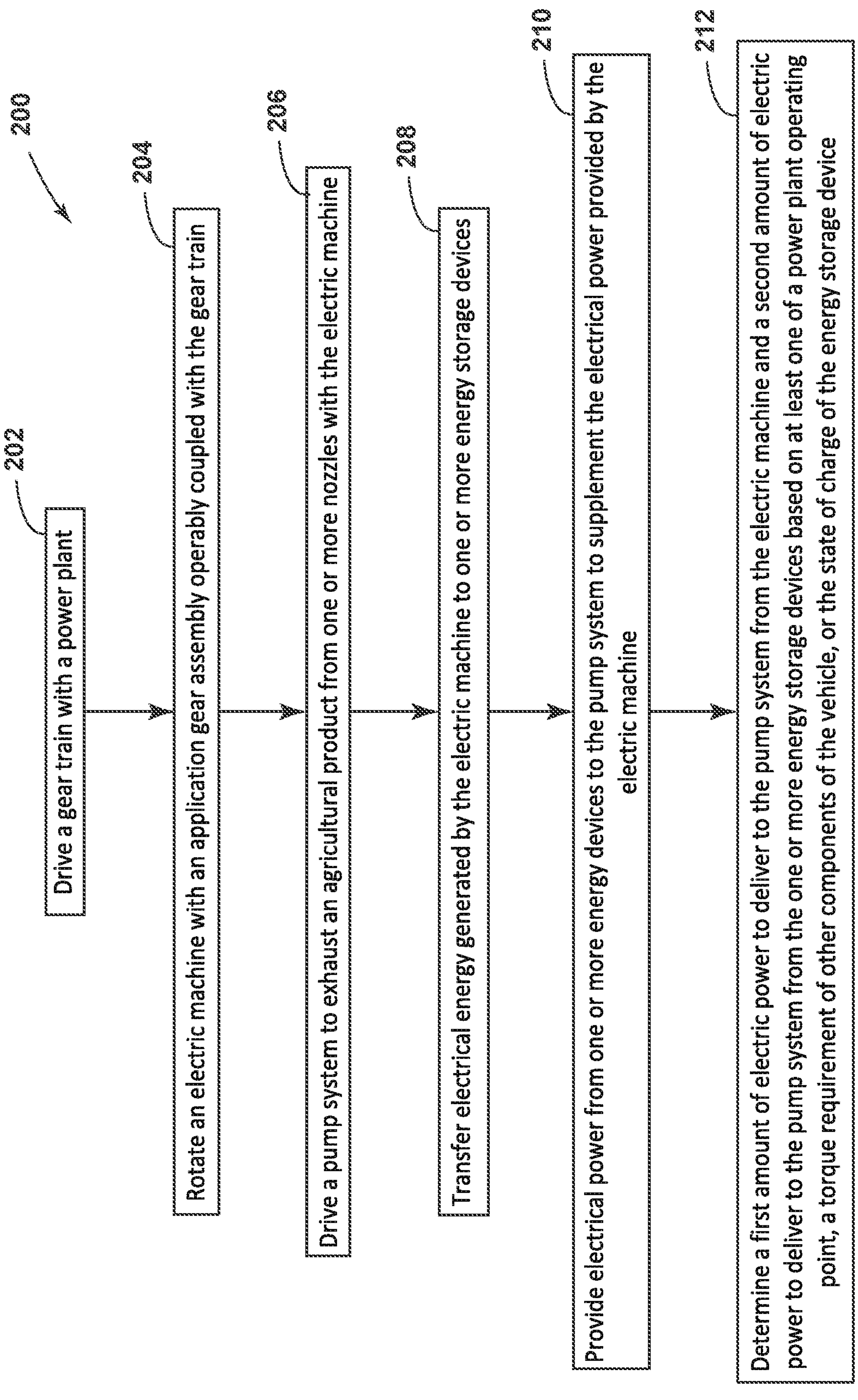
FIG. 5 illustrates a flow diagram of a method for operating an agricultural system in accordance with aspects of the present subject matter.
Figure 6:
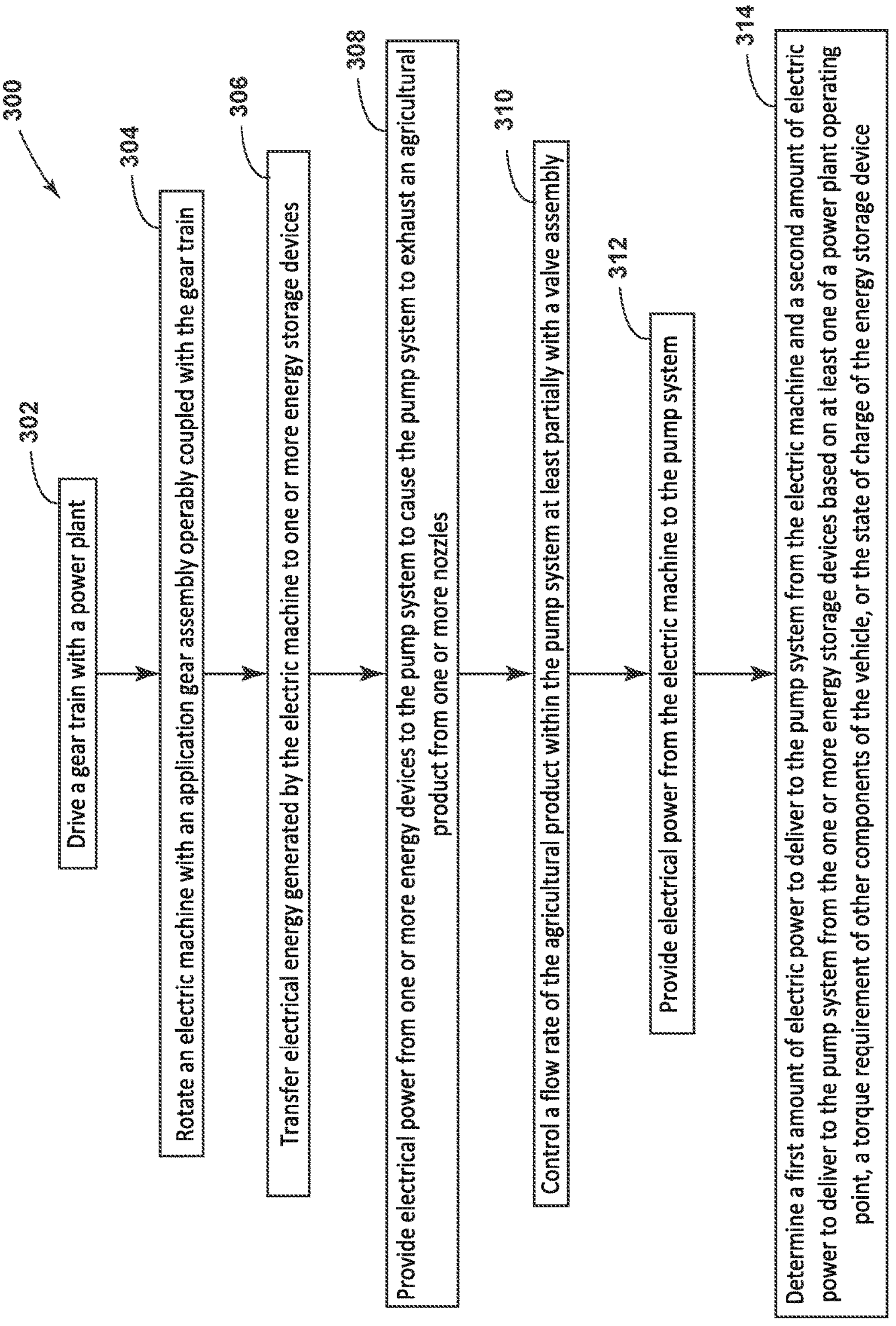
FIG. 6 illustrates a flow diagram of a method for operating an agricultural system in accordance with aspects of the present subject matter.

Referring now to FIGS. 5 and 6, flow diagrams of respective methods 200, 300 for operating an agricultural system are illustrated in accordance with aspects of the present subject matter. In general, the methods 200, 300 will be described herein with reference to the agricultural sprayer 10 shown in FIGS. 1-4. However, it will be appreciated that the disclosed methods 200, 300 may be implemented with agricultural machines having any other suitable machine configurations and/or within systems having any other suitable system configuration without deviating from the present disclosure. In addition, although FIGS. 5 and 6 depict steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As illustrated in FIG. 5, at (202), the method 200 can include driving a gear train with a power plant. As provided herein, the gear train may be part of a transmission system of the vehicle and/or any other assembly operably coupled with the power plant. The power plant may be configured as an engine, a motor, a hybrid engine-motor combination, and/or any other practicable power delivering assembly.

At (204), the method 200 can include rotating an electric machine with an application gear assembly operably coupled with the gear train. As provided herein, the electric machine may be configured as an electric motor/generator. In various examples, the electric generator may generally include a rotor and a stator. The rotational energy generated by the application gear assembly can be configured to rotate the rotor of the electric generator relative to the stator. Such relative movement may generate electrical power.

At (206), the method 200 can include driving a pump system (electrically, mechanically, or otherwise) to exhaust an agricultural product from one or more nozzle assemblies with the electric machine. In some cases, the pump system can include a valve assembly. In such instances, the method can include controlling a flow rate of the agricultural product within the pump system at least partially with a valve assembly.

At (208), the method 200 can include transferring electrical energy generated by the electric machine to one or more energy storage devices. At (210), the method 200 can include providing electrical power from one or more energy devices to the pump system to supplement the electrical power provided by the electric machine.

At (212), the method can include determining a first amount of electric power to deliver to the pump system from the electric machine and a second amount of electric power to deliver to the pump system from the one or more energy storage devices based on at least one of a power plant operating point, a torque requirement of other components of the vehicle, or the state of charge of the energy storage device As illustrated in FIG. 6, at (302), the method 300 can include driving a gear train with a power plant. As provided herein, the gear train may be part of a transmission system of the vehicle and/or any other assembly operably coupled with the power plant. The power plant may be configured as an engine, a motor, a hybrid engine-motor combination, and/or any other practicable power delivering assembly.

At (304), the method 300 can include rotating an electric machine with an application gear assembly operably coupled with the gear train. As provided herein, the electric machine may be configured as an electric motor/generator. In various examples, the electric generator may generally include a rotor and a stator. The rotational energy generated by the application gear assembly can be configured to rotate the rotor of the electric generator relative to the stator. Such relative movement may generate electrical power.

At (306), the method 300 can include transferring electrical energy generated by the electric machine to one or more energy storage devices. In various examples, the one or more energy storage devices may be configured as one or more batteries, such as one or more lithium-ion batteries, or alternatively may be configured as any other suitable electrical energy storage device.

At (308), the method 300 can include providing electrical power from one or more energy devices to the pump system to cause the pump system to exhaust an agricultural product from one or more nozzle assemblies. In some cases, the pump assembly can include one or more pumps, motors, and/or valve assemblies. In such instances, at (310), the method 300 can include controlling a flow rate of the agricultural product within the pump system at least partially with a valve assembly.

At (312), the method 300 can include providing electrical power from the electric machine to the pump system. In some instances, at (314), the method can include determining a first amount of electric power to deliver to the pump system from the electric machine and a second amount of electric power to deliver to the pump system from the one or more energy storage devices based on at least one of a power plant operating point, a torque requirement of other components of the vehicle, or the state of charge of the energy storage device.

In various examples, the methods 200 and 300 may implement machine learning methods and algorithms that utilize one or several machine learning techniques including, for example, decision tree learning, including, for example, random forest or conditional inference trees methods, neural networks, support vector vehicles, clustering, and Bayesian networks. These algorithms can include computer-executable code that can be retrieved by the computing system and/or through a network/cloud and may be used to evaluate and update the boom deflection model. In some instances, the machine learning engine may allow for changes to the boom deflection model to be performed without human intervention.

It is to be understood that the steps of any method disclosed herein may be performed by a computing system upon loading and executing software code or instructions that are tangibly stored on a tangible computer-readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as any of the disclosed methods, may be implemented in software code or instructions that are tangibly stored on a tangible computer-readable medium. The computing system loads the software code or instructions via a direct interface with the computer-readable medium or via a wired and/or wireless network. Upon loading and executing such software code or instructions by the computing system, the computing system may perform any of the functionality of the computing system described herein, including any steps of the disclosed methods.

The term “software code” or “code” used herein refers to any instructions or set of instructions that influence the operation of a computer or controller. They may exist in a computer-executable form, such as vehicle code, which is the set of instructions and data directly executed by a computer’s central processing unit or by a controller, a human-understandable form, such as source code, which may be compiled in order to be executed by a computer’s central processing unit or by a controller, or an intermediate form, such as object code, which is produced by a compiler. As used herein, the term “software code” or “code” also includes any human-understandable computer instructions or set of instructions, e.g., a script, that may be executed on the fly with the aid of an interpreter executed by a computer’s central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An agricultural system comprising:

a power plant;

a transmission system operably coupled with the power plant;

a product application system operably coupled with the transmission system through an application gear assembly, the product application system further comprising:

an electric machine operably coupled with the application gear assembly;

a pump system operably coupled with the electric machine;

one or more nozzle assemblies configured to exhaust an agricultural product, the agricultural product driven by the pump system; and a computing system communicatively coupled to the application system, the computing system including a processor and associated memory, the memory storing instructions that, when implemented by the processor, configure the computing system to determine whether to operate the electric machine in a first state or a second state based on one or more operational conditions, wherein the one or more operational conditions includes at least one of a power plant operating point, a torque requirement of other components of a vehicle, or the state of charge of an energy storage device.

2. The agricultural system of claim 1, further comprising: one or more tanks fluidly coupled with the pump system.

3. The agricultural system of claim 1, further comprising: an energy storage device operably coupled with the electric machine.

4. The agricultural system of claim 3, wherein the electric machine is operably coupled with the pump system and the energy storage device in a parallel arrangement.

5. The agricultural system of claim 4, wherein the electric machine is configured as a generator and a motor.

6. The agricultural system of claim 5, wherein the electric machine is configured to operate in the first state to generate electrical power from a rotational movement of the application gear assembly.

7. The agricultural system of claim 6, wherein the electrical power is used to operate the pump system.

8. The agricultural system of claim 6, wherein the electrical power is stored in the energy storage device.

9. The agricultural system of claim 6, wherein the electric machine is configured to operate in the second state in which energy stored within the energy storage device drives the electric machine to operate the pump system.

10. The agricultural system of claim 1, wherein the computing system is further configured to control a flow rate of the agricultural product within the pump system at least partially with a valve assembly.

11. A method for operating an agricultural system, the method comprising:

driving a gear train with a power plant;

rotating an electric machine with an application gear assembly operably coupled with the gear train;

driving a pump system to exhaust an agricultural product from one or more nozzle assemblies with the electric machine; and determining, by a computing system, whether to operate the electric machine in a first state to generate electrical power from rotational movement of the application gear assembly, or in a second state in which energy stored within one or more energy storage device drives the electric machine to operate the pump system, based on at least one of a power plant operating point, a torque requirement of other components of a vehicle, or the state of charge of an energy storage device.

12. The method of claim 11, further comprising:

transferring electrical energy generated by the electric machine to one or more energy storage devices.

13. The method of claim 11, further comprising:

providing electrical power from the one or more energy devices to the pump system to supplement the electrical power provided by the electric machine.

14. The method of claim 13, further comprising:

determining a first amount of electric power to deliver to the pump system from the electric machine and a second amount of electric power to deliver to the pump system from the one or more energy storage devices based on at least one of a power plant operating point, a torque requirement of other components of the vehicle, or the state of charge of the energy storage device.

15. A method for operating an agricultural system, the method comprising:

driving a gear train with a power plant;

rotating an electric machine with an application gear assembly operably coupled with the gear train, wherein the application gear assembly is operably coupled with the gear train such that an output of the application gear assembly is in a parallel arrangement with one or more output shafts of a transmission system operably coupled with the power plant;

transferring electrical energy generated by the electric machine to one or more energy storage devices;

providing electrical power from one or more storage energy devices to a pump system to cause the pump system to exhaust an agricultural product from one or more nozzle assemblies; and determining a first amount of electric power to deliver to the pump system from the electric machine and a second amount of electric power to deliver to the pump system from the one or more energy storage devices based on at least one of a power plant operating point, a torque requirement of other components of a vehicle, or a state of charge of the energy storage device.

16. The method of claim 15, further comprising:

providing electrical power from the electric machine to the pump system.

17. The method of claim 15, further comprising:

controlling a flow rate of the agricultural product within the pump system at least partially with a valve assembly.

18. The agricultural system of claim 15, wherein the application gear assembly is operably coupled with the gear train such that an output of the application gear assembly is in a parallel arrangement with one or more output shafts of the transmission system operably coupled with the power plant.

* * * * *